United States Patent [19]

Hodgkins et al.

[11] Patent Number: 4,956,081
[45] Date of Patent: Sep. 11, 1990

[54] FUEL FILTER WITH DIAPHRAGM PUMP

[75] Inventors: David H. Hodgkins, Granby; M. Craig Maxwell, Colchester, both of Conn.

[73] Assignee: Stanadyne Automotive Corp., Windsor, Conn.

[21] Appl. No.: 252,060

[22] Filed: Sep. 30, 1988

[51] Int. Cl.$^5$ ............................................. B01D 29/00
[52] U.S. Cl. .................................... 210/136; 210/232; 210/249; 210/416.4; 210/443
[58] Field of Search .................. 210/416.1, 416.4, 232, 210/249, 443, 136; 261/DIG. 8; 123/180 P, 187.5 R, 557; 417/471, 571; 248/222.1

[56]  References Cited

U.S. PATENT DOCUMENTS

| | | | |
|---|---|---|---|
| 4,126,557 | 11/1978 | Hodgkins | 210/249 |
| 4,447,370 | 5/1984 | Kobayashi et al. | 261/DIG. 8 |
| 4,470,301 | 9/1985 | Hutchins et al. | 210/114 |
| 4,491,120 | 1/1985 | Hodgkins | 123/557 |
| 4,618,423 | 10/1986 | Hodgkins | 210/305 |

Primary Examiner—W. Gary Jones
Assistant Examiner—Matthew Savage
Attorney, Agent, or Firm—Chilton, Alix & Van Kirk

[57] ABSTRACT

A fuel conditioner unit for an internal combustion engine, having a priming pump in which the pump diaphragm member also functions as the pump manual actuating surface. The diaphragm is mounted to the basin portion of the priming pump, so that it has a convex projecting surface adapted to be pushed by the user. A spring associated with the basin, biases the diaphragm outwardly so that it can recover after each downward push by the user. The priming pump basin, suction and discharge legs are preferably integrally formed at the upper portion of the unit frame or base. The frame is made of molded plastic such that an opening or archway is formed between the suction and discharge legs. The plastic frame is sandwiched between the filter housing and a steel bracket, with spring clips passing from the bracket through the archway and into retaining engagement with the housing. The anchor points on the bracket and the housing do not stress the plastic frame.

7 Claims, 3 Drawing Sheets

FUEL FILTER WITH DIAPHRAGM PUMP

BACKGROUND OF THE INVENTION

The present invention relates to apparatus for conditioning fuel for an internal combustion engine, and more particularly, to a fuel filter having a manually operable priming pump.

The practical necessity for conditioning fuel drawn from a fuel tank, prior to introduction into an internal combustion engine, is well known, particularly in diesel systems. One example of a known fuel conditioner is described in U.S. Pat. No. 4,491,120 "Fuel Conditioner". The unit described in that patent includes a manually operable priming pump mounted on the base or frame of the unit, to facilitate priming of a fuel system after a filter cartridge has been changed or the occurrence of exhaustion. The priming pump also provides a convenient means for expelling water. The priming pump described therein, includes a plunger type actuation, by which the user pushes down on a rigid disk, which advances a push rod, which in turn activates a diaphragm or the like to produce the required pumping action.

SUMMARY OF THE INVENTION

It is an object of the present invention to simplify and reduce the cost of manufacturing a fuel conditioner unit having a priming pump.

This object is achieved in accordance with the invention by utilizing the pump diaphragm member as the pump manual actuating surface. The preferred material which has the desired properties of flexibility and rigidity, is a material made of elastomer and plastic. The diaphragm is mounted to the basin portion of the priming pump, so that it has a convex, projecting dome surface adapted to be pushed by the user. A spring associated with the basin, biases the diaphragm outwardly, so that it can recover after each downward push by the user.

The priming pump basin, and suction and discharge legs are preferably integrally formed at the upper portion of the unit frame or base. In another cost saving embodiment of the invention, the frame is made of molded plastic rather than cast metal. An opening or archway is formed between the section and discharge legs of the priming pump. The plastic frame is sandwiched between the filter housing and a steel bracket, with spring clips passing from the bracket through the archway and into retaining engagement with the housing. The anchor points on the bracket and the housing do not stress the plastic frame, and thus avoid long term deformation resulting from creep.

BRIEF DESCRIPTION OF THE DRAWINGS

These and other objects and advantages of the invention are described more fully below with reference to the accompanying drawings, in which.

DESCRIPTION OF THE PREFERRED EMBODIMENT

Figure 1:
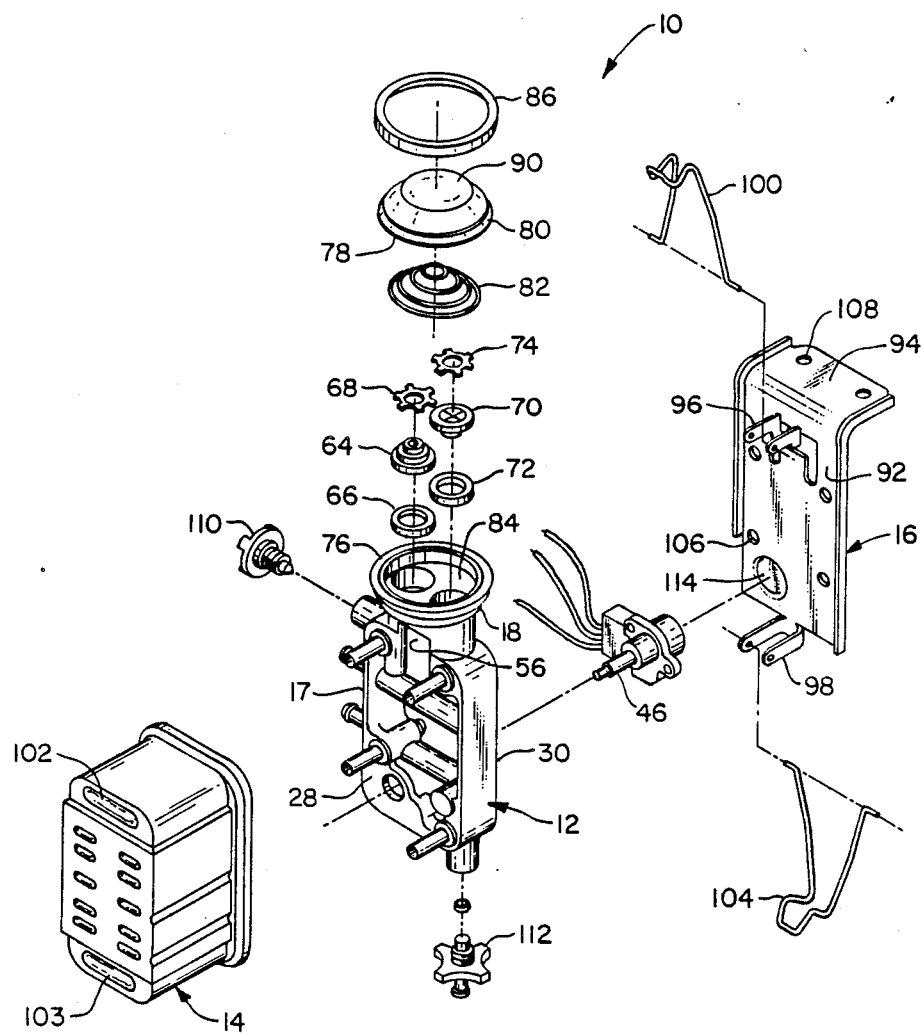
FIG. 1 is an exploded view of the fuel conditioner in accordance with the preferred embodiment of the invention.
Figure 2:
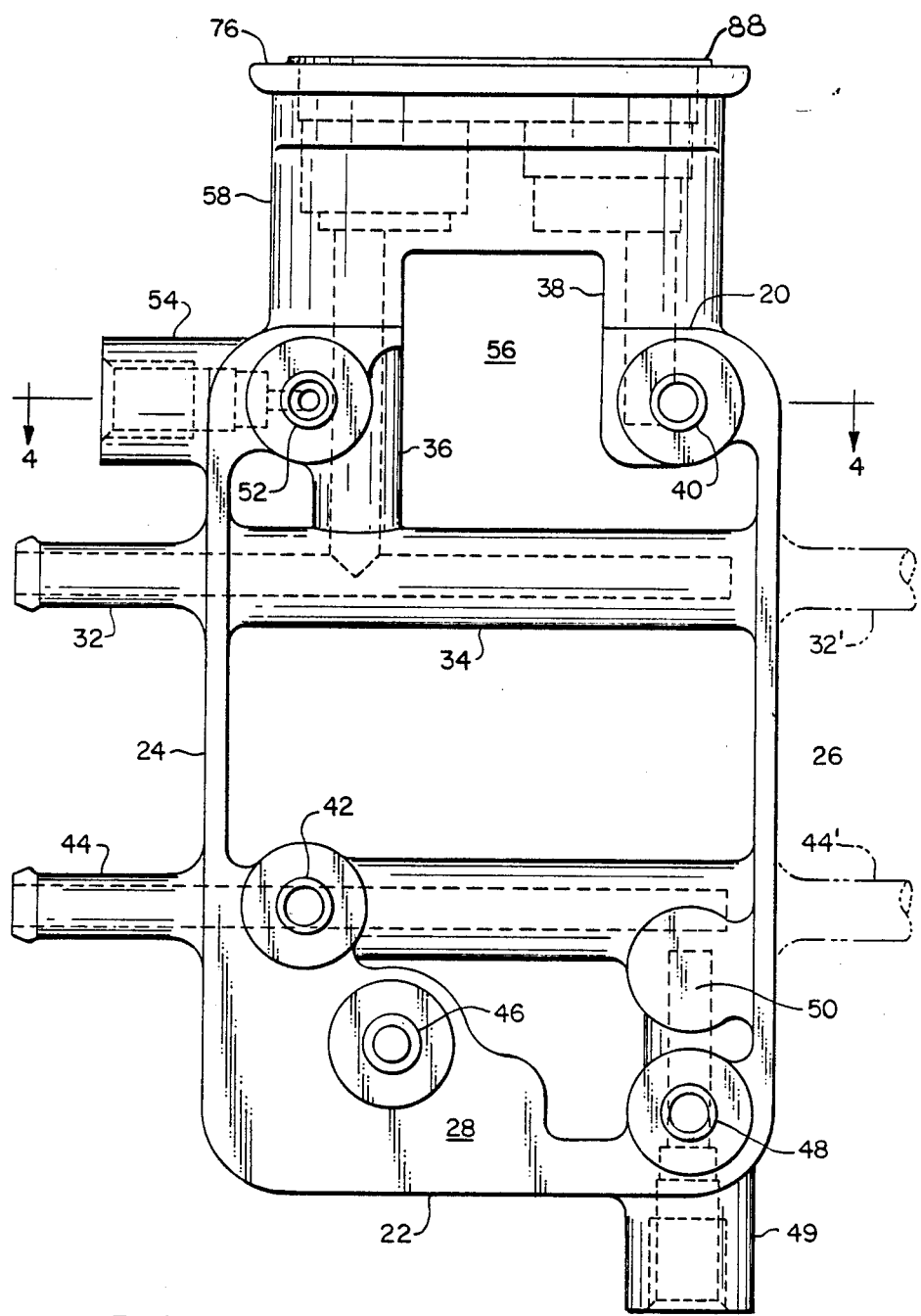
FIG. 2 is a side view of the frame assembly including the priming pump basin.
Figure 3:
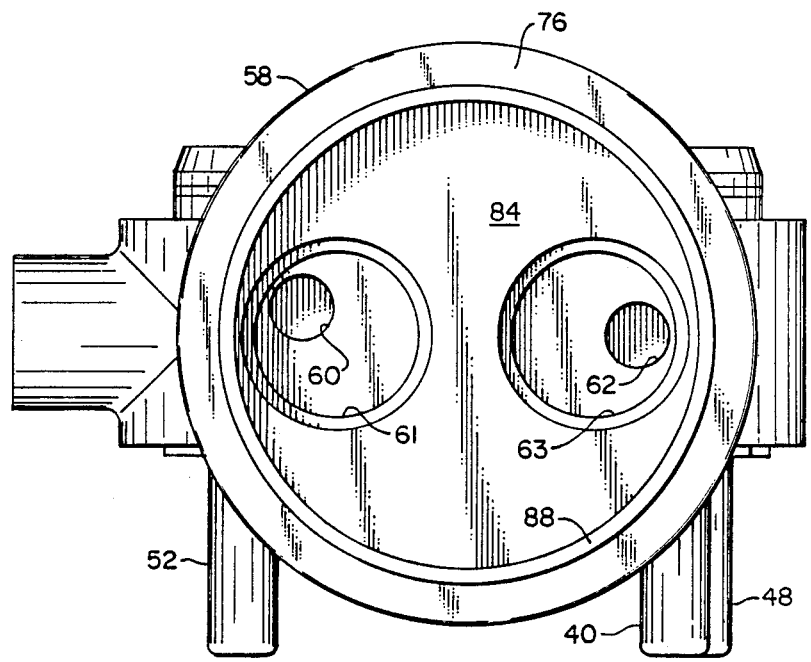
FIG. 3 is a top view of FIG. 2.
Figure 4:
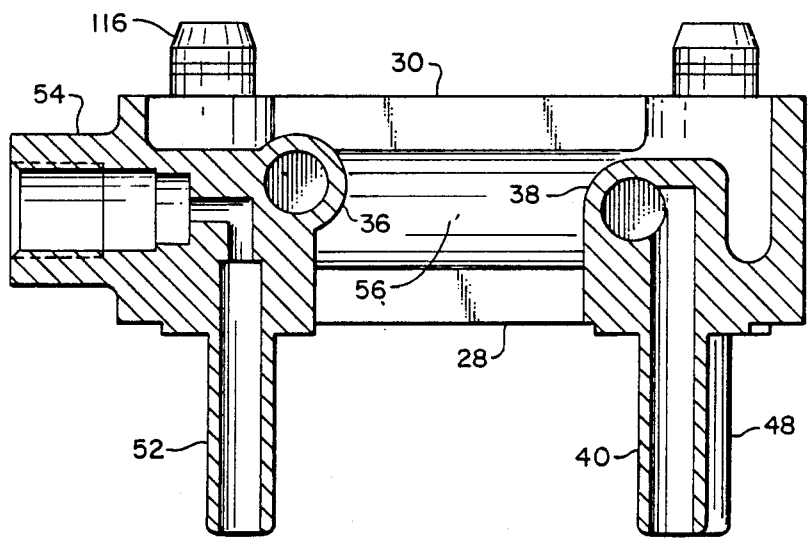
FIG. 4 is a section view taken along line 4—4 of FIG. 3.

FIG. 1 shows an exploded view of a fuel conditioner 10 in accordance with the present invention. The unit is formed from three basic components, a frame assembly 12, a filter housing 14, and a bracket 16. As also shown in FIGS. 2–4, the frame assembly 12 is preferably made of molded plastic, in the form of a base 17 having a priming pump 18 extending therefrom. The base portion 17 of the frame 12 is generally rectangular, with top 20, bottom 22, front 24, and back 26 exterior surfaces. One side 28 of the base 17 is adapted to receive the filter housing 14, whereas the mounting side 30 is adapted to engage the bracket 16.

Inlet port 32 is formed on the front 24 of the base 17, and leads to integral conduit 34, which in turn is fluidly connected to a vertically extending, integral suction leg 36 for the priming pump 18. An integral discharge leg 38 leads from the pump 18 to integral conduit 40, which projects from the filter side 28 of the frame into the housing 14. Similarly, conduit 42 projects integrally from the filter side 28 of base 17, and leads to the outlet port 44, which projects integrally from the front 24 of the base. A water sensor 46 may also be mounted in the base to project therefrom. Drain conduit 48 leads to drain port 49 for manual draining. Optionally, a constant drain orifice can be provided at location 50 above the water sensor 46. A vent conduit 52 and associated vent port 54 are integrally formed in upper front portion of the frame.

In a manner known in this field of technology, the filter housing 14 is substantially self sealed except for holes (not shown) which are adapted to sealingly pass over and engage the conduits 40, 42, 48, and 52, and sensor 46, which project from the filter side 28 of the frame 17. The ports and conduits associated with the frame are preferably integrally formed therein, and may be located on or within the frame in positions other than those shown in the Figures, e.g., the inlet and outlet ports could be located as shown in phantom at 32' and 44', respectively.

The suction leg 36 and discharge leg 38 are preferably vertically oriented and laterally spaced apart, thereby forming an archway 56. The upper portions of the suction and discharge legs 36 and 38 open into a cup-like basin 58 in which suction opening 60 is formed in socket 61, and discharge opening 62 is formed in socket 63. A one way suction valve 64 and associated washer 66 and retaining ring 68 are mounted in the suction socket 61, and, similarly, one way discharge valve 70 and associated washer 72 and retaining ring 74 are mounted in discharge socket 63. The valves 64, 70 are arranged so that valve 64 opens only when the pressure in the basin 58 is lower than that in the inlet port 32 and inlet conduit 36, whereas the discharge valve 70 opens only when the pressure in the basin 58 is greater than the pressure in the discharge conduit 40. It should be appreciated that the fuel entering the unit 10 thus passes through a passageway that begins with the inlet port 32 and extends along conduit 34 to the suction leg 36, through basin 58, down discharge leg 38 into the housing 14, through the filter or other conditioning elements contained in the housing chamber (not shown), whereupon the conditioned fuel leaves the housing 14, passes through conduit 42, and is drawn from the unit 10 through outlet port 44.

The upper rim 76 of the basin is substantially circular and adapted to provide a mating surface for the circular lower rim 78 on diaphragm 80. A spring 82 is interposed between the floor 84 of the basin 58 and the diaphragm 80, thus assuring that the diaphragm maintains a convex, outwardly projecting crown surface 90. The diaphragm 80 is secured to the upper rim of the basin, by a sheet metal ring 86 crimped to hold the diaphragm in sealing engagement with the rim. The rim can have a lip 88 to improve the effectiveness of the crimp seal.

The diaphragm 80 can be made of rubber, or preferably an elastomeric and plastic material such as is available under the trade name Hytrel from Dupont. This affords a good combination of flexibility and rigidity so that the diaphragm itself can be used as the actuating surface upon which the user presses. If desired, the crown portion 90 of the diaphragm can be reinforced, as by a plastic plate, to reduce the unit load of the spring force against the diaphragm. The spring assures that the diaphragm recovers to its convex position after each manual actuation.

When the frame 12 is made of molded plastic, significant stresses on the frame should be avoided to prevent long term creep and thus deformation. Conventionally, the frame would include provision for the mounting of clips, by which the housing 14 could be secured to the frame. In accordance with another feature of the present invention, the frame base 17 is sandwiched between the filter housing 14 and metal bracket 16, with the bracket 16, not the base 17, providing one anchor point. Thus undesirable stress loadings associated with the retaining action of the clip on the housing 14 are avoided. In the illustrated embodiment, the bracket has an elongated portion 92 and a bent short portion 94. The long portion includes upper and lower ears 96, 98. Ears 96 align with archway 56, so that the associated upper clip 100 passes through the archway and engages the filter at notch 102. The lower clip 104 is pivotly mounted to lower ears 98 and can swing unobstructed around the bottom 22 of base 17, into engagement with notch 103 on housing 14. Holes 106 can be provided for receiving split fingers 116 on the mounting side 30 of base 17, to facilitate handling of the bracket 16 and frame assembly 12 as a subassembly when the housing 14 is removed. Holes 108 are provided in the short portion 94 for mounting the unit 10.

It should be appreciated that the details and options associated with the fuel conditioning within the filter housing will not be described in detail. The water level sensing, manual draining, and continuous draining, along with air venting, can readily be accomplished from the passageways and ports shown in the various figures. Optionally, vent plug 110 and drain plug 112 can be provided for selective venting and draining. Similarly, bracket 16 can be provided with a mounting seat 114 for the water level sensor 46, and associated electronics.

We claim:

1. A fuel conditioning unit for an internal combustion engine comprising:
   a frame having a perimeter including top, bottom, front and rear walls, and having first and second sides;
   a priming pump projecting upwardly from the top wall of the frame;
   a housing connectable to one side of the frame and containing an internal chamber for receiving at least one fuel filter element;
   flow passage means for directing a flow of fuel into an inlet port in the frame, through the priming pump, the chamber, and out of an outlet port in the frame;
   wherein the prime pump comprises,
      a basin having a suction opening for receiving fuel from the inlet port and a discharge opening for delivering fuel to the chamber,
      suction valve means associated with the suction opening, for admitting fluid into the basin only when the fluid pressure in the basin is less than the fluid pressure in the inlet port,
      discharge valve means associated with the discharge opening, for discharging fluid from the basin into the chamber only when the fluid pressure in the basin is greater than the fluid pressure in the chamber,
      a diaphragm sealingly mounted to the basin and forming a dome thereover, and
      means associated with the basin, for biasing the diaphragm convexly outwardly, such that the diaphragm provides a crown surface for manually actuating the priming pump;
   a mounting bracket of material dissimilar to that of the frame connected to the other side of the frame; and
   clip means connected between the bracket and the housing, for holding the bracket, frame and housing together as an assembled unit.

2. The fuel conditioning unit of claim 1, wherein the basin and the flow passage means from the inlet port to the chamber are integrally formed in the frame.

3. The fuel conditioning unit of claim 2, wherein
   the priming pump is connected to the flow passage means by a vertical suction leg and a vertical discharge leg, the legs being spaced apart laterally to define an archway below the basin, and
   the clip means are anchored in the bracket and pass through said archway into engagement with the housing, for holding the bracket, frame and housing together as an assembled unit.

4. A fuel conditioning unit for an internal combustion engine comprising:
   a frame having top, bottom, front and rear walls, and having first and second sides, the frame integrally defining a plurality of flow passages into and out of at least one frame wall;
   a housing connectable to one side of the frame and containing an internal chamber for receiving a fuel conditioning element such that said flow passages interact with the chamber whereby a flow of fuel can pass into the frame through a wall of the frame, be directed through said one side of the frame into the chamber and return to the frame from the chamber and pass out of the frame through a wall;
   a bracket for mounting to a vehicle, said bracket consisting of a part separate from and connected to the other side of the frame; and
   clip means connected between the bracket and the housing, for holding the bracket, frame and housing together as an assembled unit.

5. The fuel conditioning unit of claim 4, wherein the bracket is made from a material dissimilar from that of the frame.

6. The fuel conditioning unit of claim 4, including a priming pump carried by the frame, and wherein said flow passages include a pump inlet passage and a pump discharge passage integrally formed in the frame.

7. The fuel conditioning unit of claim 6, wherein the pump inlet passage and the pump discharge passage are spaced apart to define a recess in the frame; and
   said clip means include a portion passing through said recess into engagement with the housing, for holding the bracket, frame and housing together as an assembled unit.

* * * * *